Sept. 13, 1949.   D. A. BUZZELL ET AL   2,481,497
PROCESS FOR PRODUCING FUSED CERAMIC RIPRAP
Filed Sept. 15, 1948
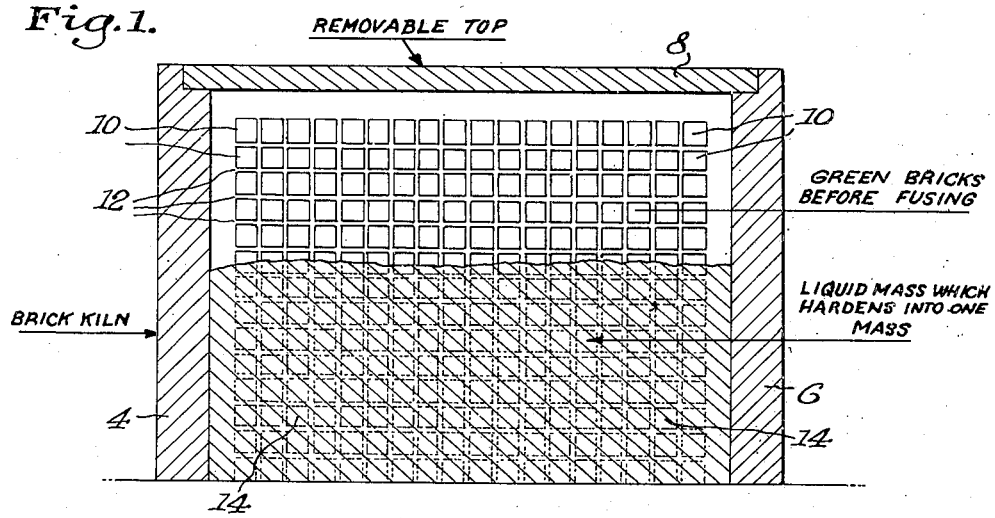
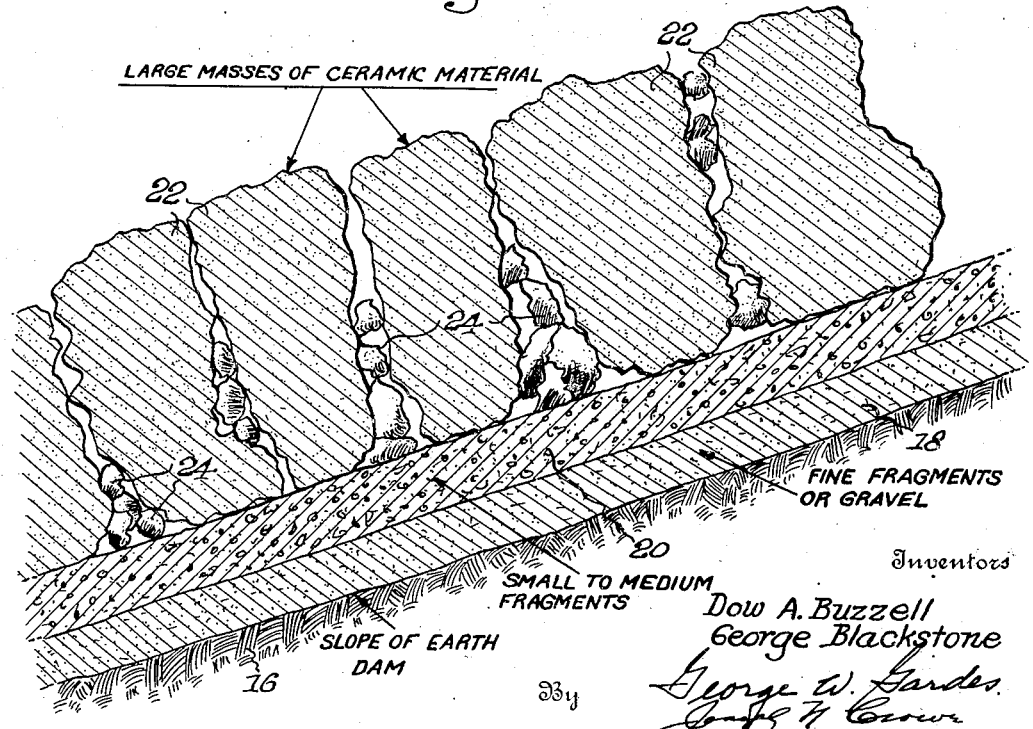
Inventors
Dow A. Buzzell
George Blackstone
Attorneys Patented Sept. 13, 1949

2,481,497

UNITED STATES PATENT OFFICE 2,481,497

PROCESS FOR PRODUCING FUSED CERAMIC RIPRAP

Dow A. Buzzell, Arlington, Va., and George Blackstone, Fort Peck, Mont.

Application September 15, 1948, Serial No. 49,454

4 Claims. (Cl. 25—157)

(Granted under the act of March 3, 1883, as amended April 30, 1928; 370 O. G. 757)

The invention described herein may be manufactured and used by or for the Government for governmental purposes, without payment to us of any royalty thereon.

In many locations and for many purposes, it is necessary to protect the slopes of earthen embankments against erosion by weather or by water, such as the slopes of dams, levees, banks of rivers and the like, the protection being afforded usually by the application of riprap composed of stones or broken quarry rock or masonry, to form a foundation or sustaining wall in which the units of stones or broken masonry, or similar material, are thrown together haphazardly, and without order, until the slope or surface to be protected is covered with the riprap.

In view of the cost of hauling and handling quarry rock riprap unless the site of its use is situated close to the quarries, it is desirable to find a substitute material for use in riprap. Large deposits of a loamy soil containing certain amounts of clay, and known as loess are available over very widespread areas, and, in accordance with this invention, there have been found ways in which such widely occurring soils can be employed instead of the quarry rock or broken stone riprap which is customarily and widely employed as riprap.

The present invention has been the outgrowth of economic necessities for finding suitably available materials for use as riprap in locations remote from rock quarries. Thus, many of the western railroads of the United States, located far from rock supplies, have used burnt clay ballast satisfactorily. It now is a matter of common knowledge that hard-burned brick is almost inert chemically and when burned to the point of vitrification, it is non-absorbent, tough, hard, and resistant to erosion. In view of this fact, many efforts were made in the developments leading to the present invention, to fuse ordinary commercial bricks together in various patterns of log cabin type units, for producing riprap material. The general idea underlying these investigations was to heat those units to the point of incipient fusion, when it was hoped that fusion at points of contact, together with the weight of the bricks, would cause them to unite. This was found to be possible especially with bricks made of clays having a wide range of burning temperature, but not commercially feasible when the burning range was narrow. In such cases, it was found that no matter how carefully the application of fire is handled, it is almost impossible to prevent the entire contents of a kiln from running together to form a solid mass resembling blast furnace slag.

However, the experience gained from such investigations, and knowledge derivable therefrom, have led to the present invention for providing a fused ceramic riprap or slope protection material formed by overburning raw clay products of a certain composition in such a manner that large masses are fused together into a nearly solid, relatively homogeneous mass, and then broken up into pieces suitable for use as riprap or slope protection.

The invention has as one of its important objects the provision of an improved process for burning the widely available loam-sand-clay deposits known as loess into hard, rock-like masses suitable for use as riprap.

A further object of the invention is to provide improvements in the kiln burning of brick-like units.

A still further object of the invention is to modify the composition of the ceramic products being burned so as to control the burning characteristics of the product in the kiln.

A still further object of the invention is to produce ceramic compositions of the above-indicated character that will produce when suitably burned, a final product which compares favorably in specific gravity and surface characteristics with quarry stone for riprap purposes.

Still further objects of the invention will become apparent as the description proceeds, and the features of novelty will be pointed out in particularity in the appended claims.

As has been indicated above, the fused ceramic riprap of the present invention is formed by overburning raw clayey products of a known composition in such a manner that large masses are fused together in a nearly solid, relatively homogeneous mass, and then broken up into pieces suitable for handling and use as riprap or slope protection.

In practicing this invention, any usual brick manufacturing plant is suitable for the manufacture of the improved product of the invention, and in operation the process parallels commercial brick production up to a certain point. In practice it has been found that an essential feature of the process is the use of raw materials having a wide burning range. In making brick, this means that as the temperature of the kilns is raised, the green bricks will fuse slowly enough to allow the entire mass to become semi-liquid before partial collapse occurs. In using soils such as the fine loess of the character distributed over wide areas of the central States of the United States, fusion-retarding elements must be added to whatever soil is encountered at the site where the material is to be manufactured. Where the raw material is a soil such as the aforesaid loess, the material fuses rapidly at about 1750° F., and liquifies so rapidly that the blocks of green brick are coated with liquid silica while the interiors are relatively untouched. To control this undesirable action, colloidal clays are added to the soil to the extent of from ten to about twenty per cent by volume. When thoroughly admixed with the loess, the "burning range" or range of temperature over which incipient fusion can be maintained without breakdown liquification of the surface material is extended to such a point that blocks of green bricks can be thoroughly vitrified and at the same time welded together to form desirable masses.

In order to secure a final product which compares favorably in specific gravity with quarry stone, sand or crushed rock may be added to the green mixture. It has been found in practice that when loess soils are employed, the specific gravity of the final fused product can be controlled by adding sand in quantities varying from five to twenty-five per cent, depending on the analysis of the loess soil. Also, the heat control of the kilns is important, it being found in practice that the temperature of the kilns should be held in the range of from approximately 1650° F. to approximately 1800° F. for approximately one hour to assure the proper fusion of the loess-clay-sand mixtures.

In carrying out the process of the present invention, the loess-sand-clay mixture formed as described above, is processed through a vacuum press type of brick-making machine. Such machines are readily available and are commonly used for the manufacture of quality commercial brick. In carrying out the process of the invention, it is found that it is important to treat the raw mixtures with the vacuum during the formation of the green units if high specific gravities are to be obtained in the final product.

After the green bricks are made, they are placed in the burning kilns with special attention to the size and arrangement of the interstices between racks and layers to assure free circulation of the hot gases during burning. It is found in practice that the horizontal and vertical interstices between bricks should be about fifty per cent as great as is commonly used in making ordinary brick, in order to avoid undesirable voids within the fused mass.

The temperature of the kilns is raised slowly to the fusion point of the raw material and maintained there until the entire load of the green bricks has been thoroughly fused and has collapsed into a semi-liquid mass. After the kiln has cooled, the roof slab is removed and the hardened ceramic mass is broken up into pieces of dimensions suitable for use as riprap or slope protection. This is done by barring, wedging, weight-dropping, or blasting, as in stone-quarrying. All portions of the broken material are usable in some part of the riprap, as it is desirable to use sizes ranging from fine to coarse. The breaking process is continued until this gradation has been achieved; and the specifications for placement of this material on a dam or embankment slope are duplicates of those for the placement of rock.

With the foregoing considerations in mind, attention is directed to the accompanying drawings, in which:

Fig. 1 is a diagrammatic sectional elevation through a kiln which is shown as being charged with green bricks of the above-indicated composition, which are shown as being fired, the view also showing the zone of fusion of the green bricks; and Fig. 2 is a diagrammatic sectional elevation of a slope protected with the fused ceramic riprap of the present invention.

In view of the self-explanatory legends applied to the drawings, these drawings are understandable upon inspection. However, in Fig. 1, the walls of a brick kiln are indicated at 4 and 6; the kiln being shown as being provided with a removable cover 8 and charged with vacuum-prepared green bricks 10 of the above-indicated composition disposed with close interstitial spaces 12 therebetween which, however, are large enough, and are disposed in such manner that the hot gases can penetrate readily between the layers and racks. The green bricks 10 become thoroughly fused and collapse into a semi-liquid mass indicated at 14. After the kiln has cooled, the removable cover 8 is removed and the now-solidified mass is broken out of the kiln by barring, wedging, dropping or blasting as employed in the usual stone-quarrying operations, the breaking process being continued until gradations from fine to coarse sizes are effected.

In Fig. 2 there is shown the fused ceramic riprap of this invention in place on a slope to be protected. This slope, which is indicated at 16, is covered by a suitably thick layer of the fine fragments 18 of the fused ceramic riprap described above, or this layer may be gravel, if such is available. A suitably thick layer 20 of small to medium breakage fragments, produced by the breaking of the cooled kiln charge, as has been noted above, then is applied on the layer 18, and the large masses of the fused riprap placed thereon as shown at 22, the interstitial spaces between these large masses being filled with small to medium fragments 24, as will be apparent from the drawings.

As prepared and fired in accordance with the process of the present invention, a light, loose soil such as loess, will be converted into material resembling quarry stone and suitable for riprap purposes.

The fused ceramic riprap of this invention fulfills the following physical properties:

| | |
|---|---|
| Crushing strength | 10,000 lbs. per sq. in. |
| Absorption by A. S. T. M. Test No. C67-31 | Not over 7 per cent. |
| Soundness by A. S. T. M. Test No. T-35 | 15 cycles, with negligible loss. |
| Wear by A. S. T. M. Test No. D2-33 | 6 per cent (maximum). |
| Toughness Index by A. S. T. M. Test No. D3-18 | 11 per cent. |
| Weight per cubic foot of solid material | 135 lbs. per cu. ft. |
| Weight as laid up in riprap layer | 2300 lbs. per cu. yd. (minimum). |

From the standpoint of economics, the present product is feasible to use whenever rock riprap hauls exceed 100 miles; and the foregoing physical properties closely approximate those of quarry rock.

It will be apparent that the details of the process of the invention and the particular changes entering into the composition of the green bricks may vary somewhat with the character and composition of the soil being handled and converted into the riprap; but, in general, the conditions described above will be applicable to any of the loess widely distributed over the central States of the United States, and therefore these conditions and compositions may be considered to be applicable to any ceramic materials contemplated to be processed by the invention. It therefore will be understood that it is intended and desired to embrace within the scope of the present invention such modifications and changes as may be necessary to adapt it to varying conditions and uses, as defined by the appended claims.

Having thus described our invention, what we claim as new and wish to secure by Letters Patent is:

1. The process of producing fused ceramic riprap for the protection of earth slopes and the like, from loess soils, which comprises incorporating from approximately ten per cent to approximately twenty per cent of colloidal clay and from approximately five per cent to approximately twenty-five per cent of sand into a given amount of loess soil, the said parts being by volume, forming the resulting loess-clay-sand mixture into bricks under vacuum, firing the resulting bricks in a kiln environment at a temperature of from approximately 1650° F. to approximately 1800° F. until fusion of the bricks is effected, cooling the kiln, and breaking out the resulting solidified charge from the kiln as rock-like material approaching quarry rock in physical properties.

2. The process of producing fused ceramic riprap for protection of earth slopes, embankments, and the like, from loess soils, which comprises mixing with a loess soil from approximately five per cent to approximately twenty-five per cent by volume of colloidal clay and from approximately five per cent to approximately twenty-five per cent by volume of sand, firing the resulting mixture at a temperature of from approximately 1650° F. to approximately 1800° F. for approximately one hour until the mixture becomes fused throughout, cooling the resulting fused mass, and fracturing the resulting material into fragments suitable for use as riprap.

3. The process of producing fused ceramic riprap for protection of earth slopes, embankments, and the like, from loess soils, which comprises mixing with a loess soil from approximately five per cent to approximately twenty-five per cent by volume of colloidal clay and from approximately five per cent to approximately twenty-five per cent by volume of sand, making the resulting mixture into bricks under application of vacuum thereto during formation of the bricks, firing the resulting bricks at a temperature of from approximately 1650° F. to approximately 1800° F. until the bricks become fused throughout, cooling the resulting fused mass until it has solidified into a dense rock-like material, and breaking the said material into rock-like pieces of sizes suitable for riprap.

4. The process of producing fused ceramic riprap for protection of earth slopes, embankments, and the like, from loess soils, which comprises mixing colloidal clay and sand with the soil proportioning the clay and sand to the soil for producing after fusion a rock-like mass comparable to quarry rock in physical properties, forming the resulting mixture into bricks while subjecting the mixture to suction during the brick-making operation, firing the resulting bricks at a temperature of from approximately 1650° F. to approximately 1800° F. until the resulting material becomes molten throughout, cooling the resulting fused mass until it has solidified into a dense, rock-like mass, and breaking the mass into fragments resembling quarry rock, which fragments are adapted to be used as protective revetments on earth slopes and the like.

DOW A. BUZZELL.
GEORGE BLACKSTONE.

REFERENCES CITED

The following references are of record in the file of this patent:

UNITED STATES PATENTS

| Number | Name | Date |
| --- | --- | --- |
| 408,860 | Stubbs | Aug. 13, 1889 |
| 495,134 | Heafer | Apr. 11, 1893 |
| 1,311,978 | Lambert | Aug. 5, 1919 |
| 1,912,772 | Higgins | June 6, 1923 |